(12) United States Patent
Manish et al.

(10) Patent No.: US 7,075,904 B1
(45) Date of Patent: Jul. 11, 2006

(54) METHOD AND SYSTEM FOR MULTICASTING MESSAGES TO SELECT MOBILE RECIPIENTS

(75) Inventors: Mangal Manish, Overland Park, KS (US); Kevin R. O'Connor, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 774 days.

(21) Appl. No.: 09/993,213

(22) Filed: Nov. 16, 2001

(51) Int. Cl.
*H04J 1/00* (2006.01)
*H04J 3/26* (2006.01)
*H04L 12/28* (2006.01)
*H04L 12/56* (2006.01)

(52) U.S. Cl. .................. 370/312; 370/390; 370/432

(58) Field of Classification Search ............ 370/338, 370/432, 400, 401, 351, 465, 466, 392, 389, 370/312, 328, 390
See application file for complete search history.

(56) References Cited

U.S. PATENT DOCUMENTS

| | | | |
|---|---|---|---|
| 5,887,252 | A | 3/1999 | Noneman |
| 6,104,709 | A | 8/2000 | Rinchiuso et al. |
| 6,215,790 | B1 | 4/2001 | Voit et al. |
| 6,625,773 | B1 * | 9/2003 | Boivie et al. ............. 714/749 |
| 6,781,999 | B1 * | 8/2004 | Eyuboglu et al. .......... 370/399 |
| 6,856,604 | B1 | 2/2005 | Lundby |
| 2001/0003706 | A1 | 6/2001 | Warburton et al. |
| 2003/0087653 | A1 | 5/2003 | Leung et al. |
| 2004/0043770 | A1 | 3/2004 | Amit et al. |

FOREIGN PATENT DOCUMENTS

WO    WO 98/03002    1/1998

OTHER PUBLICATIONS

Copy of the International Search Report from a corresponding PCT application.
Tao Chen et al., "cmda2000 Broadcast Services Stage 2: System Design", QUALCOMM Incorporated, Samsung Electronics Co., Ltd., SK Telecom, 51 pages (2001).
"TR45 Wireless IP Architecture based on IETF Protocols PN-4286-A (to be published as TIA/EIA/TSB-115)", pp. 1-51 (Jun. 6, 2000).
International Preliminary Examination Report from International Application No. PCT/US02/30131, dated Jun. 19, 2003.

* cited by examiner

*Primary Examiner*—Chi Pham
*Assistant Examiner*—Kevin C. Harper

(57) ABSTRACT

A method and system for multicasting or broadcasting a message to a specific group of mobile stations or to a specific group of cell sectors in a cellular wireless communication system. The method may include maintaining a record of which mobile stations are in a particular multicast group, and may include maintaining a record of which cell sectors are currently serving one or more members of the multicast group. The records may be maintained at one or more network entities, such as a radio network multicast router/server and/or hosts on a packet-switched network. By sending multicast messages, such as IP messages, to only those cell sectors currently serving members of a multicast group, network resources may be conserved.

19 Claims, 7 Drawing Sheets

TABLE 1

| MULTICAST ADDRESS | SECTORS OF INTEREST | |
|---|---|---|
| 224.1.2.3 | 20 | 24 |

METHOD AND SYSTEM FOR MULTICASTING MESSAGES TO SELECT MOBILE RECIPIENTS

BACKGROUND

1. Field of the Invention

The present invention relates to telecommunications and, more particularly, to a method and system for broadcasting or multicasting a message to a specific group of mobile stations in a cellular wireless communications system.

2. Description of Related Art

The advent of wireless telecommunications, such as cellular telephony, has extended the functionality available to wireless users: Just as a user can operate a cellular telephone or other mobile station (MS) to place a voice call to virtually any telephone number, a user can also operate a suitably equipped MS (such as, for example, a web-enabled wireless telephone) to place a data call to virtually any remote computer. Once such a connection is established, a remote computer can send data to the MS, much as a remote computer might send data to any personal computer connected to the Internet.

In a typical cellular radio communications system (i.e., a wireless telecommunications network), an area is divided geographically into a number of cell sectors, each defined by a radio frequency (RF) radiation pattern or air interface from a respective base transceiver station (BTS) antenna. A number of MSs (such as cellular telephones, personal digital assistants (PDAs) and/or other devices) may operate concurrently in a given cell sector, all communicating via the air interface with a common BTS. In turn, the BTSs from a number of cell sectors may communicate concurrently with a common base station controller (BSC), which may function to aggregate and control traffic for the multiple BTSs. A number of BSCs may then communicate concurrently with a common gateway, such as a packet data serving node (PDSN) or mobile switching center (MSC), which may function to set up and connect communications to or from other entities. The BTS, BSC and gateway, in combination, comprise a radio network that provides network connectivity for an MS.

Generally, a user's MS is allocated a dedicated channel over which data may be sent and received. However, there are a number of specialized services that multiple wireless customers may find desirable. Examples of services that may be sent to multiple users could include:

Location-based advertising;
Vertical services, maintenance, and administrative messages
Public information services, such as sports scores, traffic conditions, weather alerts, etc.;
Video clips of newsworthy events; and
Audio and video streaming.

In some specialized services, a number of MSs in a cell sector (or even all customers in the cell sector) would receive the same message. This does not present much of a problem when only a few users are to receive the data, but can tax a network's capacity as more users receive the same message. One resource that can be taxed is the air interface. The air interface between MSs and the radio network is a scarce resource, and its use should be conserved whenever possible. In addition, as high-bandwidth applications become more commonplace, the capacity between other entities and links in wireless communications networks may also be taxed. As an example, if a BTS is to support a number of concurrent high-bandwidth communications with multiple MSs, the link between the BTS and the BSC must support all of that traffic at once.

The link between a BTS and BSC, though, is typically a transmission line with a finite bandwidth. Similarly, the link between the BSC and a gateway such as a PDSN or MSC is typically a transmission line with finite bandwidth. Of course, it is possible to increase traffic capacity between various network elements by simply adding more transmission lines. Adding transmission lines, though, can be very expensive, since it requires a provider to either physically add the lines, or to lease additional lines from a local exchange carrier (LEC). Leasing lines from LECs to increase the traffic capacity between network elements can, in fact, be a significant portion of a cellular provider's total operating cost.

Thus, when a particular message (especially, but not necessarily, one requiring a significant amount of available bandwidth) is to be sent to a relatively large number of MSs within a cell sector (or to multiple cell sectors), a system for transmitting the message that conserves the cellular system's bandwidth is a significant improvement over a multicast system that transmits messages to cell sectors indiscriminately. Moreover, it would also be desirable to control which users have access to specialized services so that users who want such services can be required to pay for them, and also so that users who do not want the services are not bothered by unwanted messages.

SUMMARY

The present invention is directed to an improved mechanism for transmitting data to multiple MSs in a cellular wireless communication network. The invention generally does this by (i) maintaining in a network entity a record of which MSs are in a given multicast group, (ii) maintaining in a network entity a record of which sectors are currently serving one or more members of the multicast group (which can be referred to as "sectors of interest"), (iii) providing each such MS with a key to facilitate receipt of a multicast or broadcast message, and (iv) multicasting or broadcasting the message to only the sectors of interest. Various network arrangements and processes can be employed to carry out these functions.

In an exemplary embodiment, each message that is to be sent can be an IP message, sent over a PPP channel to a 3G MS. The PPP channel could be established between a PDSN and the 3G MS. In this regard, the basic network architecture can include multiple BTSs coupled to a BSC. The BSC may then be coupled to the PDSN, which in turn is coupled to a packet-switched network such as the Internet. (The BSC may also be conventionally coupled to an MSC, which provides circuit-switched connectivity with the public-switched telephone network (PSTN) as well).

In the exemplary embodiment, to achieve the functions described above, the basic architecture of a cellular communications network can be modified to include the following: (a) a Radio Network Multicast Server (RNMS) communicatively coupled with, or integrated into, the BSC, (b) a Multicast Session Manager (MSM) communicatively coupled with the PDSN, (c) a Multicast Application Server (MAS) communicatively coupled with the PDSN; and (d) an MS client, for filtering (for example, at the radio link layer) incoming messages on a broadcast channel, so that higher levels of the protocol stack receive a given broadcast message only if the filter allows it. In the exemplary embodiment, valuable network resources can be conserved by transmitting multicast or broadcast messages only to BTSs that serve cell sectors with MSs of the multicast groups present in those cell sectors. For example, if MSs authorized to receive a particular multicast service are present in a first cell sector, but no such MSs are present in a second cell sector, the message will only be sent to the first cell sector. Thus, all of the entities and communication links between at least the BSC and the BTS of the second cell sector will not experience any increase in traffic due to the messages sent to MSs in the first cell sector.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
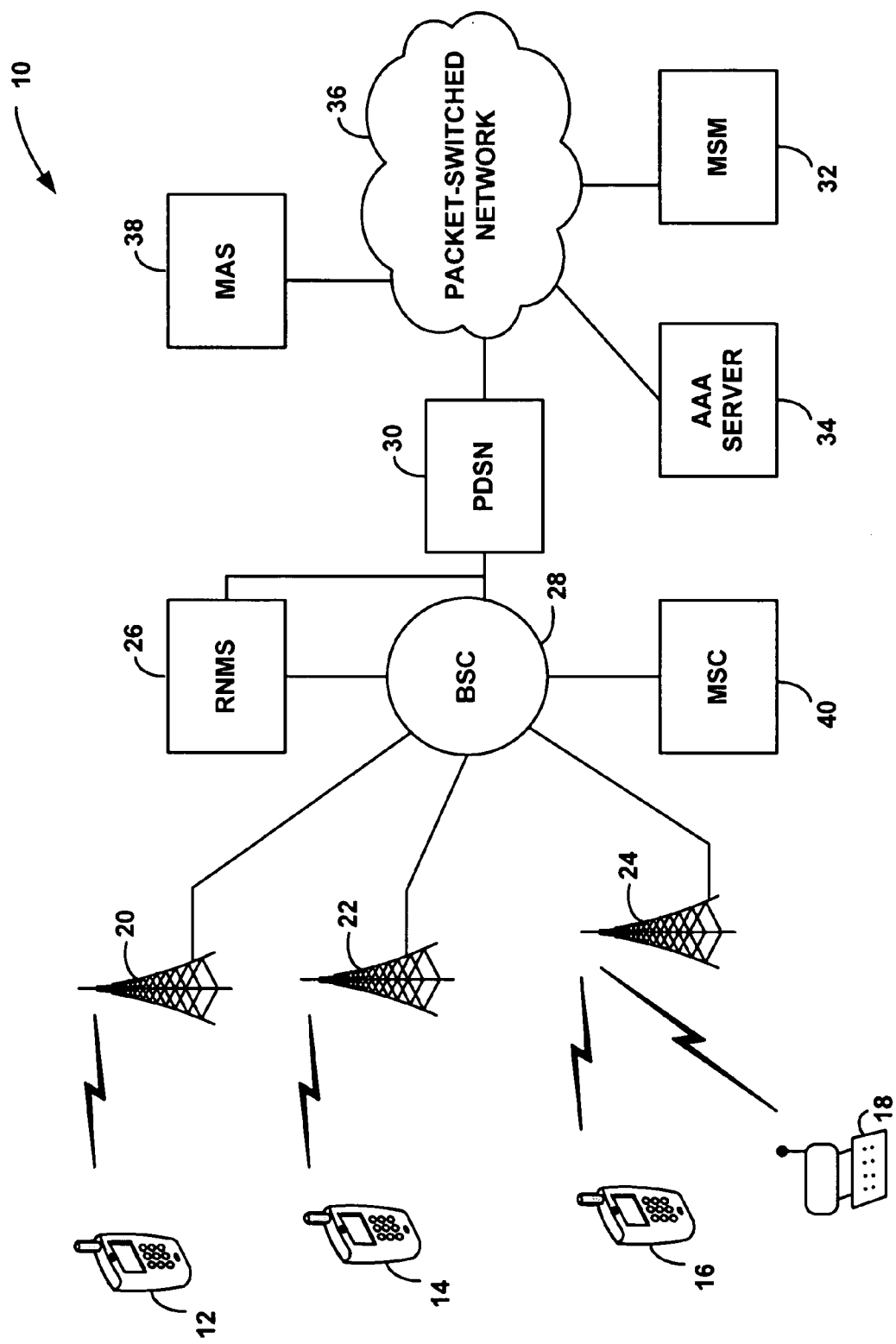
FIG. 1 is a simplified block diagram of a communication system for carrying communications between a mobile station and remote network entities in which the exemplary embodiment can be implemented.

Referring to the drawings, FIG. 1 is a generalized block diagram of a communication network 10 suitable for communications between one or more MSs and various network entities. As shown in FIG. 1, the network 10 may include a radio network that comprises various network entities, such as: base transceiver stations (BTSs) 20, 22, and 24; radio network multicast router/server (RNMS) 26; base station controller (BSC) 28; and packet data serving node (PDSN) 30, such as a CommWorks® Total Control® 2000 or the like. In addition, BSC 28 may be coupled to a mobile switching center (MSC) such as MSC 40, as in conventional cellular networks. Because BTSs 20, 22, 24, BSC 28, PDSN 30, and MSC 40 can be conventional components of a radio network, they are not described in detail here.

PDSN 30 serves as an interface between the radio network and a packet-switched network such as packet-switched network 36 (which may be the Internet). In the exemplary embodiment, a multicast application server (MAS) such as MAS 38, an authentication, authorization, accounting (AAA) server such as AAA server 34, and a multicast session manager such as MSM 32 may be communicatively coupled to packet-switched network 36 (and thus ultimately to the radio network via PDSN 30). It should be noted that MSM 32, AAA server 34, and MAS 38 are functional entities, and any or all of the functions performed by these entities could be integrated into a single entity (or other, multiple entities that perform one or more of the functions in combination). Furthermore, any or all of MSM 32, AAA server 34, and MAS 38 could be directly coupled rather than via packet-switched network 36.

For clarity only, multiple network entities, such as RNMSs, PDSNs, BSCs, MSMs, and MASs have been omitted from the drawings, although a network in which the invention may be implemented could include more than one RNMS, PDSN, BSC, MSM, and MAS.

MAS 38 may generally store and periodically transmit a range of multicast content for reception by MSs that belong to a multicast group, each multicast being associated with a particular IP multicast address. MAS 38 may be a server on the IP core network (i.e., the Internet). In the exemplary embodiment, MAS 38 may not be co-located with a particular RNMS, although it could be. Instead, MAS 38 would be regionally placed and could thus be more readily accessed by multiple RNMSs via conventional network routers (not shown) within packet-switched network 36.

MSM 32 can provide, upon request from MSs, keys, filters, or masks needed by MSs to enable them to receive multicasts. MSM 32 may be in communication with AAA server 34 and can thus verify that any mobile station requesting to join a multicast group is authorized to join the group by communicating with AAA server 34

RNMS 26 may access a record or records that correlate radio network cell sectors of interest with particular multicast addresses. RNMS 26 signals the packet-switched network to receive multicast data packets sent from MAS 38 that have multicast addresses that correspond to sectors of interest, as indicated by the record or records. Upon receipt of such multicast packets, RNMS 26 may forward copies of the multicast packets to sectors of interest.

AAA server 34 may be a conventional component as described for a third-generation wireless system in ITU IMT-2000 requirements document Q.1701. AAA server 34 generally maintains account and authorization information as well as user profiles for MSs served by the radio network. For example, AAA server 34 could maintain a record of which, if any, multicasts an MS is authorized to receive, as well as for how long. Thus, if a user wished to terminate a multicast service at the end of a given billing period, AAA server 34 could update its record at the end of the period and the MS's request for multicasts beyond the billing period would not be authorized.

MSs 12, 14, 16, and 18 may access the packet-switched network 36 or another network, such as the PSTN (not shown), via the radio network. In operation, an MS may send, via a BTS or BSC, a "join" message to RNMS 26, indicating a request to join a particular multicast group. The join message may be an IP message transmitted via a common channel in the radio network. When a BTS or BSC receives such a join message, the BTS or BSC may programmatically add to the IP message an indication of the MS's current cell sector; the join message may then be forwarded to RNMS 26. As MSs join a given multicast group, RNMS 26 could thus get an indication of which cell sectors currently serve those MSs. RNMS 26 can maintain this information in the form of a database table that lists, for each multicast group, the cell sectors currently serving MSs that are in the multicast group. RNMS 26 could be updated in real time (described in detail below) as multicast group MSs move through the network, ensuring efficient use of the radio network.

The connections of all the entities shown in FIG. 1 are logical rather than physical; as just one example, RNMS 26 could be physically connected between BSC 28 and PDSN 30 without affecting the functionality of the present invention.

Within network 10, multiple communications devices, such as MSs 12, 14, 16, (wireless telephones) and 18 (a web-enabled PDA), may be communicatively coupled with BTS 20, 22, and 24 as shown. Although MSs 12, 14, and 16 are illustrated as wireless telephones, they may take any suitable form, such as (without limitation) wireless modems, wireless PDAs (like MS 18), or two-way pagers. MSs 12–18 may communicate with BTS 20–24 using an air interface as set forth in TIA/EIA/IS-2000. Further, MSs 12–18 could be part of a cellular system that uses another technology, such as AMPS, TDMA, DECT, GSM, PCS, or PWT; the cellular technology used is not necessarily critical to all embodiments of the present invention. Although MSs 12–18 are capable of normal voice communications via BSC 28 and MSC 40, this description will focus primarily on data communications using the network entities of network 10.

In the exemplary embodiment, MSs could join multicast groups as follows. A user with an MS, such as MS 12, might initiate a request to receive a multicast by, for example, turning on the MS or selecting a menu item on the MS's display. The request may include an option service code or other indicator that indicates packet-data. The request could first be forwarded from BSC 28 to MSC 40. MSC 40 may detect the option service code (or otherwise detect a data call) and responsively signal BSC 28 to send the message to PDSN 30 (rather than to MSC 40 as in a voice call). A PPP session could then be established between MS 12 and PDSN 30.

Next, a client (i.e., a set of software instructions) on MS 12 could set up a data communication session with MSM 32 via BTS 20, BSC 28, PDSN 30 and packet-switched network 36. MSM 32 could then authorize the user for access to private (or other) group multicasts, and transmit (using TCP/IP or a standard internet key exchange protocol, for example) a key or filtering mask to MS 12 during the data communication session to enable MS 12 to receive multicast or broadcast packets. MSM 32 could implement the authorization process by communicating with a registrar, such as AAA server 34, which may maintain records of which users are authorized to receive multicasts, among other records (e.g., subscriber profiles). MS registration could also occur with other types of registrars, such as a home location register or a service agent (not shown). As an alternative to "on-the-fly" MS registration, an MS could be pre-provisioned by a service provider—that is, the MS could have a key or mask installed at a facility rather than over a communication channel.

Multicast messages may originate as follows. Periodically, or based on triggers from other network entities or MSs, MAS 38 may transmit multicast content to a conventional router (not shown) within packet-switched network 36. As an illustration, assume that only MS 12 and MS 18 are authorized to receive private group multicasts with a particular multicast address. RNMS 26 could receive the multicast content transmitted from MAS 38 via packet-switched network 36. When RNMS 26 receives an IP multicast packet from packet-switched network 36, it may send duplicates of the packet to each cell sector that is bound to the particular IP multicast address, as indicated in a database table, in this case, the cell sectors serving MS 12 and MS 18. Thus, multicast packets may be sent from BSC 28 to BTS 20 and BTS 24 (and received by MS 12 and 18, within those sectors), but none are sent from BSC 28 to BTS 22, because BTS 22 is not serving any multicast group members.

Figure 2:
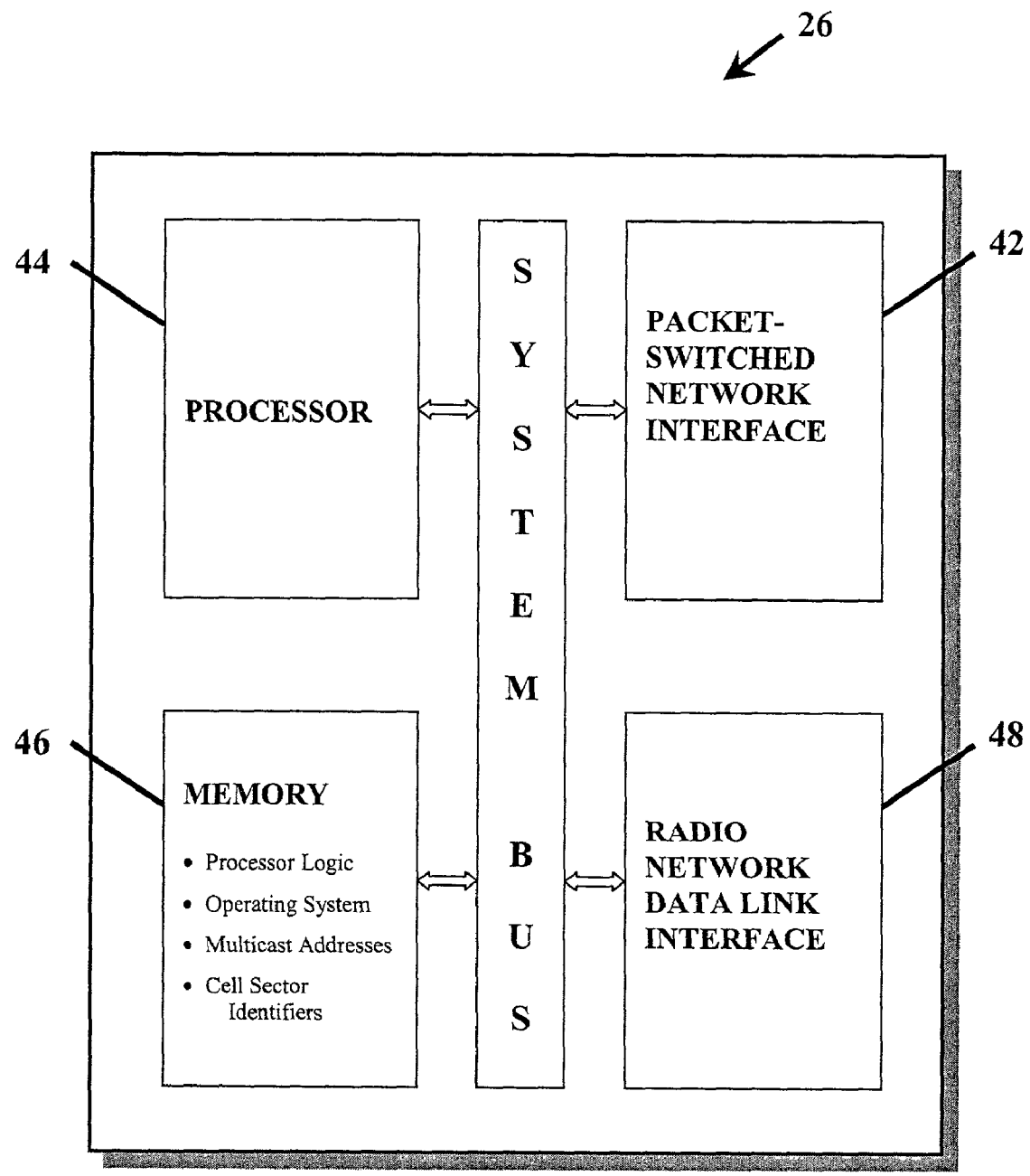
FIG. 2 is a block diagram of a radio network multicast server for use in accordance with the exemplary embodiment.

A simplified block diagram of RNMS 26 is shown in FIG. 2. The exemplary embodiment of RNMS 26 shown in FIG. 2 may have a processor 44 (e.g., an integrated circuit microprocessor), a memory 46 (e.g., memory module, ROM, RAM, flash memory, hard disk), a radio network data link interface 48, and a packet-switched network interface 42, all of which may or may not be interconnected by a system bus. Memory 46 may include more than one physical element, such as built-in ROM, RAM, a hard disk, an optical drive, a removable memory device, etc., and may also include as stored content: one or more multicast addresses, one or more cell sector identifiers; a set of stored logic by (e.g., computer instructions) executable by processor 44 to accept inputs via radio network data link interface 48 to update the information stored in memory 46 and to carry out various other functions described herein. The multicast addresses and cell sector identifiers may or may not be stored in the form of a database table, where each multicast address has one or more cell sector identifiers associated with it in the table. Provided with the present disclosure, those skilled in the art can readily prepare appropriate computer instructions to perform the functions described herein.

The radio network data link interface 48 may include input and output ports and individual links for each cell sector associated with RNMS 26. The individual links may be either logical or physical.

RNMS 26 may send multicast routing control packets to PDSN 30 and to packet-switched network 36 via packet-switched network interface 42. The multicast routing control packets may then be received by MAS 38, in order to establish multicast paths from MAS 38 to RNMS 26 via packet switched network 36 and PDSN 30. RNMS 26 may then receive (at packet-switched network interface 42) IP multicast packets transmitted from MAS 38. The packet-switched network interface 42 may also be connected directly to the packet-switched network, bypassing PDSN 30.

The particular configuration shown in FIG. 2 is not necessarily critical to the functioning of all embodiments of the present invention. For example, a device without a system bus that has a memory and processor contained in one integrated circuit could be used instead of a separate processor and memory.

Figure 3:
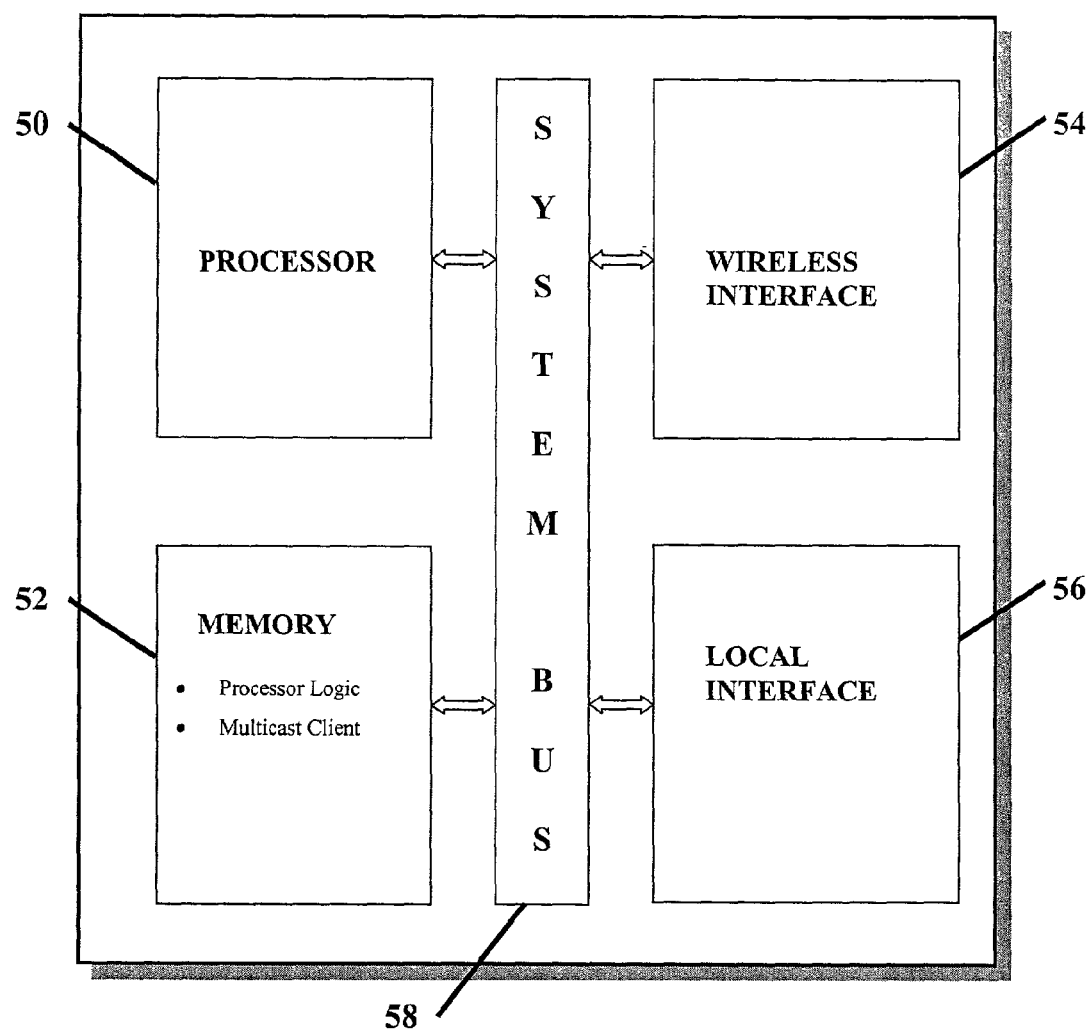
FIG. 3 is a simplified block diagram of a mobile station suitable for use with the exemplary embodiment.

Referring now to FIG. 3, a functional block diagram of an exemplary MS, such as MS 12 or MS 18, is shown. As illustrated, the MS may include a processor 50, memory 52, a wireless communications interface 54, and a local communications interface 56, all of which may be coupled together via a system bus 58. Each of these functional components may take any of a variety of forms.

Memory 52, for instance, may include a set of machine language instructions executable by processor 50 to carry out various functions described herein. (Alternatively or additionally, the MS can embody various combinations of hardware, firmware and/or software to carry out the functions described). Further, memory 52 may include other elements, such as a multicast client that processes IP multicast or broadcast data and presents it to a user. Memory 52 may comprise one or more volatile or non-volatile elements, such as flash memory, optical memory, or magnetic storage.

Wireless communications interface 54 may establish communications with the radio network via an air interface. As such, wireless interface 54 may comprise software logic (e.g., CDMA encoding logic) and/or may comprise a transceiver suitable for interfacing between processor 50 and a radio frequency antenna (not shown).

For use in an alternative exemplary embodiment, local interface 56 may function as a port for sending and receiving communications with a service provider's computer (not shown). Local interface 56 may comprise a conventional pin-out port, an infrared port, an Ethernet (RJ-45) port, or any other suitable interface. Software keys, masks, or filters that enable the MS to receive and process multicast messages may be installed in the MS via local interface 56.

In the exemplary embodiment, the MS may be at least a 3G (or, more generally, a broadband) MS. A 3G MS has the capability of establishing, maintaining, and terminating packet data sessions with PDSNs. An MS that is less than a 3G MS could also be used in the exemplary embodiment, although data throughput may be lower.

Figure 3A:
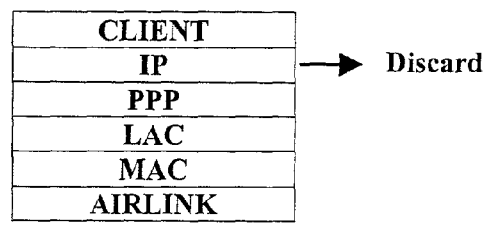

FIG. 3*a* illustrates a mobile IP protocol reference model that may be used with the exemplary MS to communicate with the PDSN 30. A similar protocol model could be used by the exemplary MS to communicate with the RNMS 26, except the PPP layer might not be used or may be replaced with a multicast data link layer protocol specific to the radio network used. As described, the exemplary MS may have a client or another component that enables it to establish, maintain, and terminate a PPP session with PDSN 30; the client may also enable the MS to receive (via the PDSN 30) and store a transmitted key or mask that allows the MS to receive and process multicast and/or broadcast data sent to it via RNMS 26. Specifically, a transmitted "key" could activate a process in the MS to cause it to recognize, at the MS's IP layer, datagrams with a particular multicast address. In such an implementation, the MS may have a fixed, relatively small number of multicast addresses that it may selectively listen for based on keys it may receive. Once activated to listen for certain multicast packets, multicast packets with the particular multicast address could be received by the client in the MS (i.e., the packets could be passed up the protocol stack to the client for further processing). In MSs that have not received a key, multicast packets could simply be discarded at the IP layer.

The application of a key or mask to pass authorized multicast data to the MS application may alternatively be performed at the data link protocol layer instead of at the IP protocol layer. In order for the radio network to transmit a multicast packet from the RNMS 26 to the MS, the radio network may require the use of a multicast group identifier at the data link layer. In that case, this multicast link layer identifier could be used instead of the multicast IP address in the filtering mechanism. Each IP multicast group address could have a corresponding link layer identifier, with each determinable from the other based on a simple translation algorithm.

As an alternative to pre-configured multicast addresses, a multicast address could be transmitted to, and stored in, the MS as a result of a registration and authorization from a network entity such as MSM 32 or AAA server 34. Once a multicast address is stored in the MS, the filtering of messages could proceed as described above. As yet another alternative to software filtering, multicast or broadcast packets could be filtered by a hardware device (such as a digital signal processor, or DSP) in the MS. As is known to skilled persons, such filtering can be performed at various different protocol layers; thus, filtering techniques other than those described here could also be implemented in the exemplary embodiment.

Figure 4:
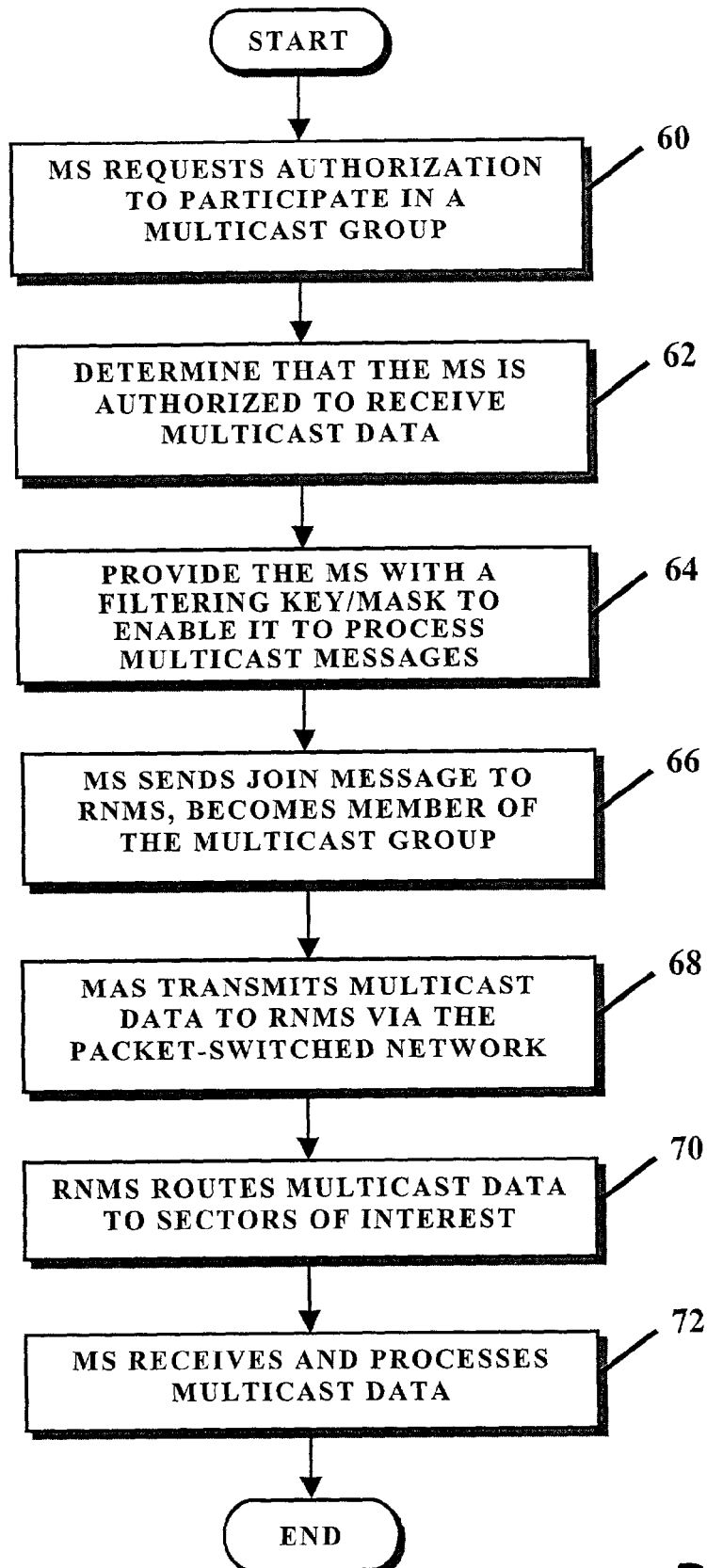
FIG. 4 is a flow chart depicting functions performed in accordance with the exemplary embodiment.

FIG. 4 illustrates generally a set of functions that may be involved in an exemplary embodiment of the present invention. At step 60, MSs, such as MS 12 and MS 18 may request authorization to participate in a particular multicast group. A network entity, such as MSM 32, may receive the authorization request via PDSN 30 and packet-switched network 36. MSM 32 may verify, by communicating with AAA server 34, that MS 12 and 18 are authorized to receive the requested multicast messages, step 62. Once MS 12 and 18 are recognized by MSM 32, MSM 32 can send a filtering key or mask to MS 12 and MS 18, as shown at step 64 and described in detail above, to allow those MSs to further process multicast messages.

Then, at step 66, MS 12 and 18 may send "JOIN" messages to RNMS 26. As illustrated by step 68, MAS 38 may, based on either time or an event trigger (such as receipt of new data via packet-switched network 36), transmit multicast data to RNMS 26 via packet-switched network 36 and PDSN 30. At step 70, when RNMS 26 receives multicast data, it may route the data to only those cell sectors currently serving MSs that have requested (by sending "join" messages) to receive the multicasts. RNMS 26 is capable of making such routing decisions because it maintains (or has access to, via another network entity) a record that correlates particular multicast groups (by multicast address) to sectors of interest. A simplified example of such a record is shown in Table 1 of FIG. 5. Further, RNMS 26 may be a multicast-aware router/server, i.e., a router/server that can actively signal a packet network to receive multicast packets with destination addresses within the IP multicast range of 224.0.0.1 through 239.255.255.255.

In the exemplary embodiment, multicast data could be sent to BTS 20 and 24, which serve sectors of interest, but not to BTS 22, since MS 14, served by BTS 22, has not requested the multicast via a "join" message. Once BTS 20 and BTS 24 receive multicast packets, the packets may be forwarded to MS 12 and MS 18, respectively, and MS 12 and 18 may receive and further process the multicast packets (for example, by formatting and displaying, on MS 12 and 18, information contained in the packets in human-readable form), as shown at step 72.

Figure 6:
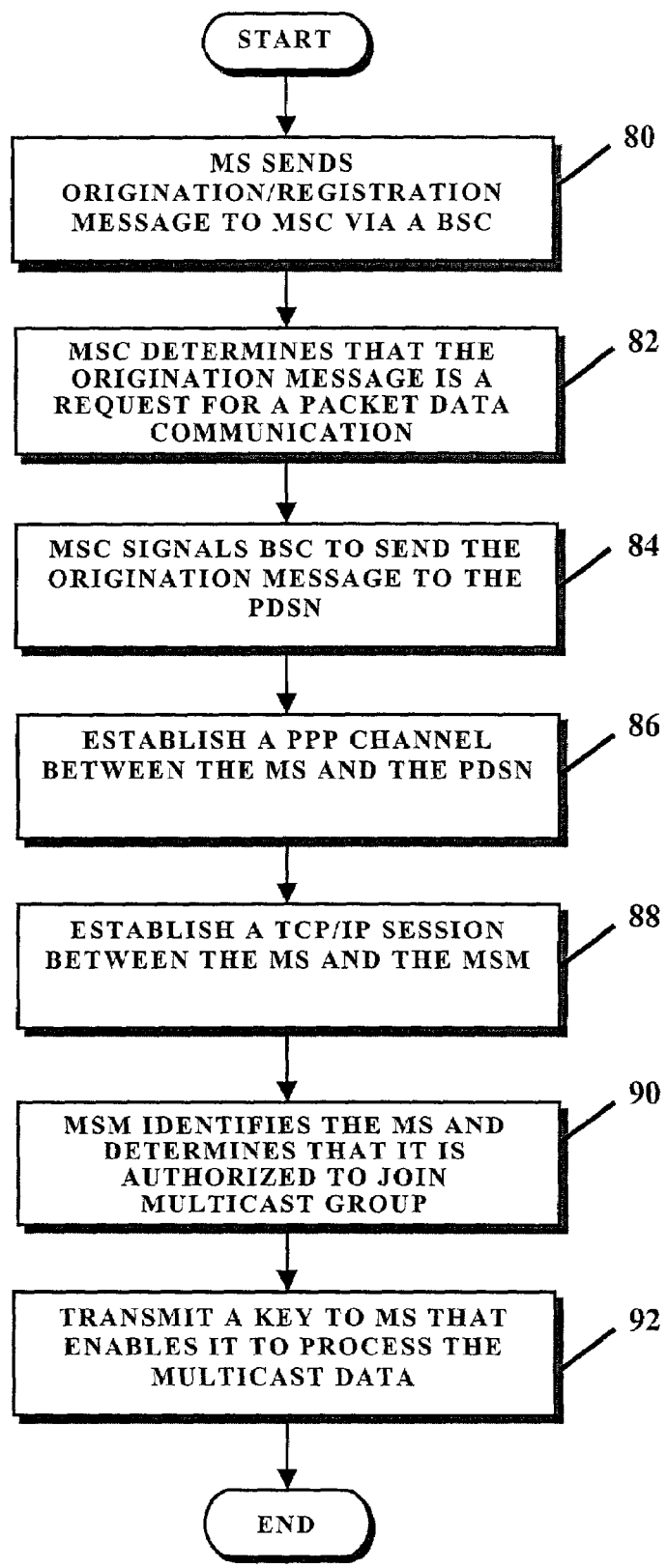

FIG. 6 illustrates a set of functions that may be involved in enabling an MS to receive and process multicast messages. At step 80, an MS may send an origination (or registration) message, via air an interface, to BSC 28, which can then forward the message to an MSC 40. More specifically, to initiate registration in a multicast group, a user could, for example, select a menu item on the MS, causing a registration message to be sent to MSC 40 via BSC 28. The origination/registration message may include information in a service option as defined by TIA/EIA-95, TIA/EIA-2000, or an equivalent standard, to determine that the call is a data call, rather than a voice call, as shown at step 82. MSC 40 can be configured to use this information and responsively send a message to BSC 28 to cause BSC 28 to transmit the data call to PDSN 30, as shown at step 84, rather than routing the call into the PSTN. Alternatively, MSC 40 could detect a data call using information other than that contained in a service option. For example, MSC 40 could recognize a data call based on the contents of OSI layer 4 (the transport layer). The method used to determine that a call is a data call is not necessarily critical to all embodiments of the present invention. PDSN 30 and the registering MS can then set up a PPP session, at step 86, and a client on the MS can set up a TCP/IP session with MSM 32, via PDSN 30 (step 88).

Next, as shown at step 90, MSM 32 can communicate with a registrar such as AAA server 34 (either via packet-switched network 36, another suitable data link, or direct connection) to determine that the MS is authorized to join the multicast group. AAA server 34 can maintain, separately or as part of a subscriber profile, a record of MSs that are authorized members of particular multicast groups. This information can be passed from the AAA server to MSM 32, making MSM 32 aware that a particular MS or group of MSs are authorized to receive multicast messages. Alternatively, the registrar function of AAA server 34 could be incorporated into MSM 32. Once MSM 32 recognizes an MS as an authorized group member, MSM 32 can transmit to the MS a filtering key/mask to the MS to enable it to receive and process multicast messages, as shown at step 92. If a multicast message reaches an MS in a sector of interest and the MS does not have a filtering key/mask, the MS will be unable to further process the message. In other words, the message will not effectively be received at an unauthorized MS.

The architecture of the present invention also supports data broadcasting as well as cell-specific multicasting. For example, RNMS 26 can interpret a broadcast-specific IP address as an address whose data is to be forwarded to all cell sectors. For filtering at the MS at the data link layer, a common link-layer broadcast identifier that would pass through all MS filters can be used by RNMS 26 when it forwards broadcast packets, enabling all MSs to further process the broadcast data. As another example, multicasts may be designated for all MSs at particular cell sectors— e.g., for public announcements on traffic conditions. For cell-specific multicasts, RNMS 26 may recognize that packets with certain IP multicast addresses are to be forwarded to specific cell sectors only. In that case, sectors 20 and 24 in Table 1 would be sectors of interest not due to the presence of MSs that are multicast group members, but because the multicast address 224.1.2.3 is "linked" to those sectors. Thus, multicast information that is only pertinent to a particular geographic area will not follow users as they move out of the area.

To facilitate the routing of multicast messages, RNMS 26 may use IETF Protocol-Independent Multicast to advertise to IP core routers the presence of multicast group members on the radio network.

Figures 5, 7:
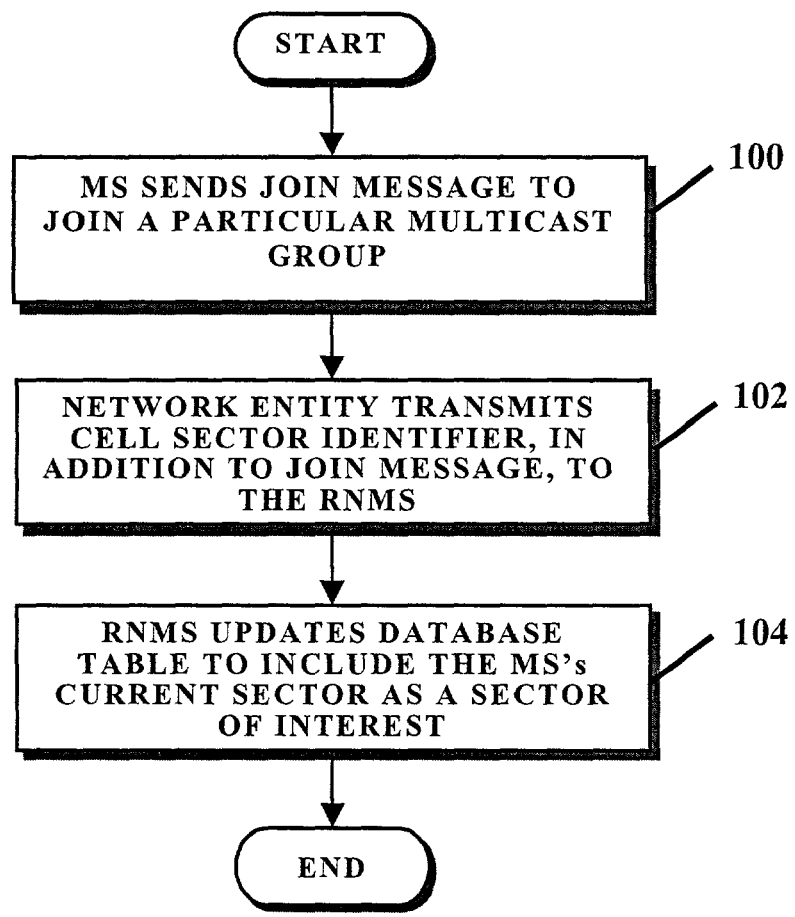
FIG. 5 is a block diagram of database table that may be used in the exemplary embodiment.
FIGS. 6 through 8 are flow charts depicting functions performed in accordance with the exemplary embodiment.

Some steps that may be involved in the process of an MS joining a multicast group are illustrated in FIG. 7. First, an MS may send a "Join" message to RNMS 26 to indicate that it is ready and authorized to receive multicast messages (step 100). More specifically, the MS may send an IP-encapsulated IETF Internet Group Membership Protocol format message in radio network link layer framing to a BTS or BSC 28 over an access channel (or other common channel) in the radio network. When a BTS or BSC 28 receives the join message, either the BTS or BSC 28 may modify or encapsulate the message (e.g., add additional data in the link layer framing of the packet data being sent) with an indicator or identifier defining the MS's current cell sector. The message can then be forwarded to RNMS 26, as shown at step 102. Next, RNMS 26 can update its database table to include the MS's current sector as a sector of interest so that multicasts intended for the MS will be routed to that sector, as shown at step 104. The database table update could also include adding or deleting multicast addresses as necessary to maintain accuracy.

Figure 8:
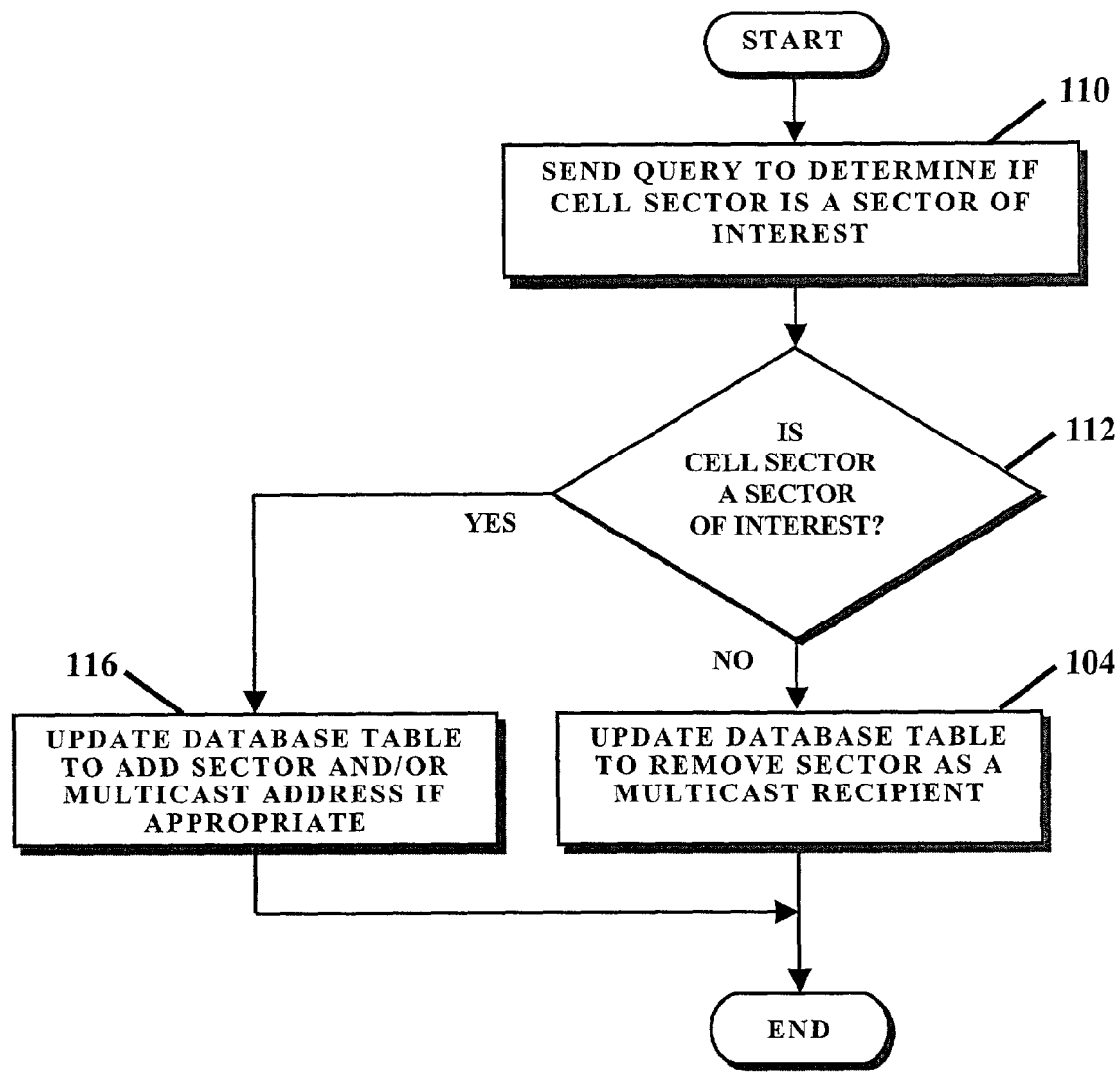

FIG. 8 illustrates some functions that may be used to ensure that the multicast database is current even after MSs leave and enter sectors of interest. As shown at step 110, a network entity such as RNMS 26 (or another entity, via the BTS), can periodically multicast queries, such as internet group management protocol (IGMP) queries, to a cell sector or sectors to determine if there is still at least one MS in a sector that is a multicast group member. If there is no such MS in the sector, the RNMS will be "aware" that the sector is no longer a sector of interest, as shown at step 112. If the sector is no longer a sector of interest, RNMS 26 could update its database table to remove the cell sector and stop routing multicast messages to the associated BTS, as shown at step 114. Conversely, if there is at least one MS in a queried sector that is a multicast group member, RNMS 26 could update its database table to add the sector as a sector of interest if the sector was not a sector of interest prior to the query, as shown at step 116.

Thus, RNMS 26 could maintain the accuracy of a database table in substantially real-time as MSs move through the network.

An exemplary embodiment of the present invention has been described above. Those skilled in the art will understand, however, that changes and modifications may be made to this embodiment without departing from the true scope and spirit of the present invention, which is defined by the claims.

We claim:

1. A method comprising:

conveying a multicast-join message respectively from each of a plurality of mobile stations, via a base transceiver station (BTS) and base station controller (BSC) serving the mobile station, to a network entity;

for each respective multicast-join message being conveyed via a given BTS or BSC, the given BTS or BSC adding to the multicast-join message an indication of which cell sector is currently serving the mobile station, so that the network entity receives the cell sector indication when the first entity receives the multicast-join message; and using the cell-sector indications added into the multicast-join messages as a basis to route multicast messages from the network entity to the mobile stations.

2. A method comprising:

conveying a multicast-join message respectively from each of a plurality of mobile stations, via a base transceiver station (BTS) and base station controller (BSC) serving the mobile station, to a first network entity;

for each respective multicast-join message being conveyed via a given BTS or BSC, the given BTS or BSC adding to the multicast-join message an indication of which cell sector is currently serving the mobile station, so that the first network entity receives the cell sector indication when the first entity receives the multicast-join message;

using the cell-sector indications added into the multicast-join messages as a basis to record at the first network entity one or more cell sectors that are currently serving the plurality of mobile stations; and receiving into the first network entity at least one multicast message, and using the record as a basis to send the at least one multicast message from the first network entity to only the one or more cell sectors indicated by the record, for air interface transmission of the at least one multicast message in turn to the mobile stations.

3. The method of claim 2, further comprising:

providing each of the mobile stations with a key that enables the mobile station to receive and process multicast messages.

4. The method of claim 3, further comprising:

receiving into each mobile station the multicast message sent from the first network entity, and processing the received multicast message at each mobile station.

5. The method of claim 3, further comprising:

receiving into a second network entity a multicast registration request from at least one of the mobile stations; and determining that the at least one mobile station is authorized, and responsively sending the key to the at least one mobile station.

6. The method of claim 2, wherein the first network entity is communicatively linked to the BSC and is further communicatively linked with the BSC and with a packet-network gateway.

7. The method of claim 2, wherein the at least one multicast message is an IP message.

8. The method of claim 2, wherein at least one of the mobile stations is a 3G mobile station.

9. The method of claim 2, further comprising maintaining at the first network entity a correlation between a multicast IP address and the one or more cell sectors identified by the record.

10. The method of claim 2, further comprising:
for each cell sector in identified by the record, periodically determining whether one or more of the mobile stations is still being served by the cell sector.

11. The method of claim 10, further comprising:
removing a given cell sector from the record if the determination is that none of the mobile stations are being served by the given cell sector.

12. The method of claim 2, wherein at least one of the mobile stations is at least a 3G mobile station.

13. A radio network multicast server (RNMS) comprising:
a processor;
memory; and
program logic in the memory and executable by the processor to perform functions including:
receiving a multicast-join message respectively from each of a plurality of mobile stations, wherein each multicast-join message is conveyed via a base transceiver station (BTS) and base station controller (BSC) serving the mobile station from which the multicast-join message is conveyed, and wherein the BTS or BSC adds to the multicast-join message an indication of which cell sector is currently serving the mobile station, so that the RNMS receives the cell sector indication when the RNMS receives the multicast-join message;
using the cell-sector indications as a basis to record in the memory one or more cell sectors that are currently serving the plurality of mobile stations; and
routing at least a given multicast message to only the cell sectors indicated by the record, for air interface transmission of the at least one multicast message in turn to the mobile stations.

14. The RNMS of claim 13, further comprising:
at least one multicast address stored in the memory and correlated in the memory with the one or more cell sectors identified by the record,
wherein the given multicast message is addressed to the multicast address, and wherein the RNMS uses the record to determine the one or more cell sectors to which the RNMS should send the given multicast message.

15. A system comprising:
a radio network comprising a base transceiver station (BTS) and a base station controller (BSC), the BTS radiating to define one or more cell sectors in which mobile stations can engage in air-interface communication with the BTS, and the BSC being communicatively linked with a packet-switched network; and
a radio network multicast server (RNMS) communicatively linked with the BSC and with the packet-switched network,
wherein the RNMS receives multicast-join messages conveyed from the mobile stations via the BTS and BSC, and wherein the BTS or BSC adds to each multicast-join message being conveyed to the RNMS an indication of which cell sector is currently serving the mobile station from which the multicast-join message is being conveyed,
wherein the RNMS uses the cell sector indications as a basis to compile a record of one or more cell sectors that are currently serving the mobile stations, and
wherein the RNMS uses the record as a basis to route at least one multicast message to only the sectors serving the mobile stations.

16. The system of claim 15, wherein the RNMS receives the at least one multicast message from the packet-switched network, and wherein the at least one multicast message is destined to a multicast IP address.

17. The system of claim 16, wherein the RNMS further correlates the multicast IP address with the cell sectors indicated in the record.

18. The system of claim 15, further comprising a multicast session manager (MSM) accessible via the packet-switched network, wherein the MSM receives from at least one of the mobile stations a multicast registration request, the MSM determines that the at least one mobile station is authorized, and the MSM responsively sends to the at least one mobile station a key that enables the at least one mobile station to receive and process multicast messages.

19. The system of claim 15, further comprising:
a multicast application server (MAS) on the packet-switched network, where the at least one multicast message is transmitted from the MAS.

* * * * *